(No Model.) 2 Sheets—Sheet 1.

F. M. SNOOK.
ICE CREAM FREEZER.

No. 522,806. Patented July 10, 1894.

Witnesses.
J. Thomson Cross
George Heidman

Inventor:
Frank M. Snook
by Stem & Allen,
Attorneys.

(No Model.)
2 Sheets—Sheet 2.

F. M. SNOOK.
ICE CREAM FREEZER.

No. 522,806.
Patented July 10, 1894.

Witnesses.
J. Thomson Cross
George Heidman

Inventor:
Frank M. Snook
by Stem & Allen
Attorneys.

UNITED STATES PATENT OFFICE.

FRANK M. SNOOK, OF CINCINNATI, OHIO, ASSIGNOR TO J. K. HOLLOWAY AND GEORGE F. DANA, OF SAME PLACE.

ICE-CREAM FREEZER.

SPECIFICATION forming part of Letters Patent No. 522,806, dated July 10, 1894.

Application filed January 29, 1894. Serial No. 498,361. (No model.)

*To all whom it may concern:*

Be it known that I, FRANK M. SNOOK, a citizen of the United States, residing at Cincinnati, in the county of Hamilton and State of Ohio, have invented certain new and useful Improvements in Ice-Cream Freezers, of which the following is a full, clear, and exact description, reference being had to the accompanying drawings, forming part of this specification.

My invention relates to ice cream freezers in which the can and beater are revolved in opposite directions by means of a crank, which may be attached either at the center of the top of the freezer, to turn horizontally, or at the side to turn vertically, and my improvements consist of certain novel combinations and arrangements of parts to be hereinafter more particularly pointed out and claimed.

Figure 1:
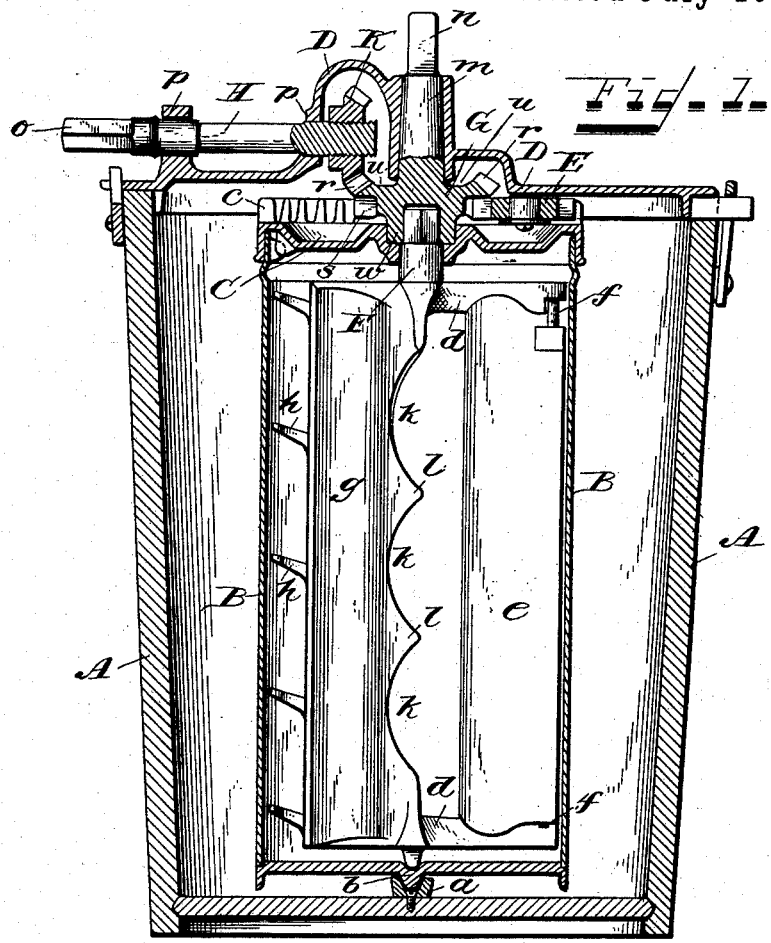
Figure 2:
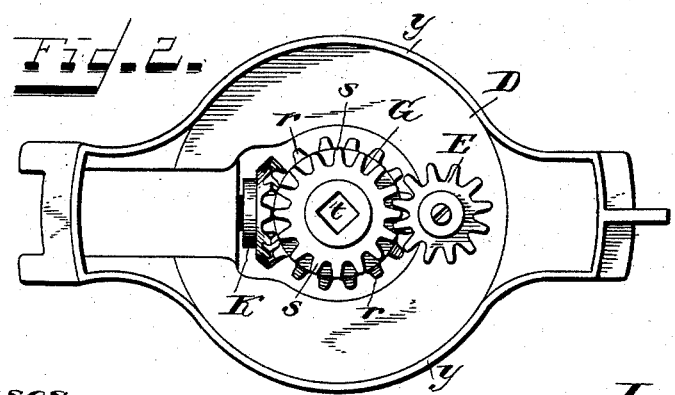
Figure 3:
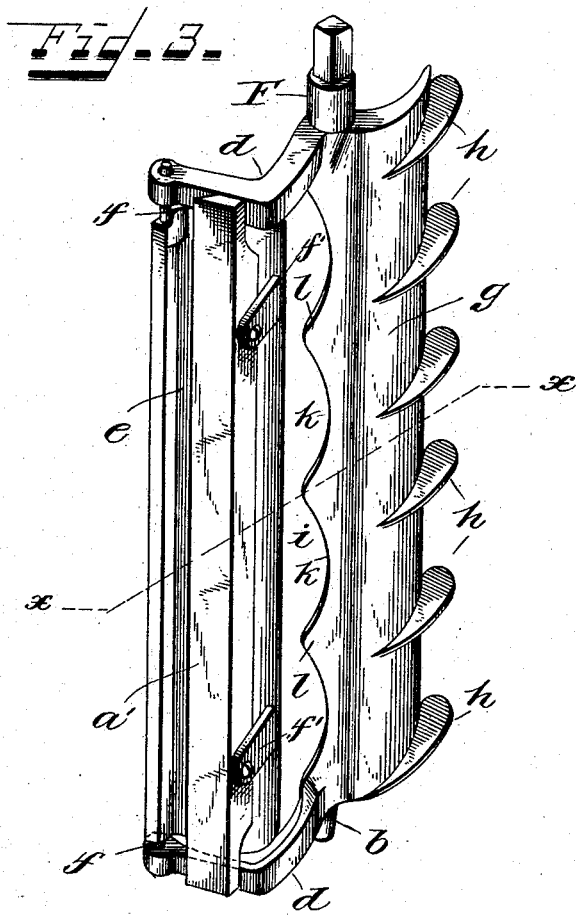
Figure 4:
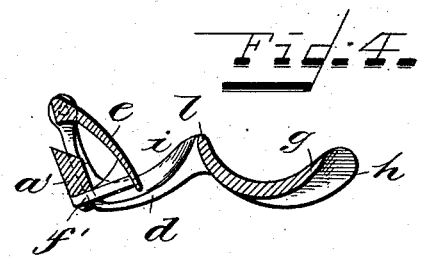

In the drawings:—Figure 1 is a central vertical section of my improved freezer. Fig. 2 is a plan view of the interior of the tub top. Fig. 3 is a perspective view of the beater. Fig. 4 is a cross section of same on the line X—X of Fig. 3.

A, is the freezer tub or bucket, of wood or other suitable material, having at the center of the bottom on the inside a bearing, $a$, for the pivot $b$ of the metallic can B, within which the cream is placed; this can is provided with a top C, the upper portion of the periphery of which is formed into a series of teeth, $c$.

D, is the tub top on the inner surface of which is secured the spur wheel E, the teeth of which mesh with the teeth, $c$, of the can top C.

The beater is, with a certain exception to be hereinafter noted, of the type long in use, and consists of a spindle F, having arms $d$, $d$, at top and bottom, extending out at right angles thereto, and provided with a bar, $e$, pivoted at $f$, $f$, to these arms, and also carrying a wooden scraper $a'$, secured by lugs $f'$ $f'$ to the bar $e$ to bear against the inside of the can. The other half of the beater consists of a bar $g$, having inclined wings or side arms $h$, $h$, to effectually beat and stir up the cream as the beater is revolved. Heretofore in beaters of this description, this bar $g$ has been solid throughout, with vertical sides, but as the cream freezes instead of being forced between the opening $i$ in these older forms, the cream is very apt to cake and revolve bodily with the beater. To remedy this defect and force the freezing cream between the two beater bars, I form a series of scallops $k$, $k$, on the bar, $g$, bringing the points, $l$, of the scallops, in a line with the inclination of the side wings $h$, $h$, thus approximating the bar $g$ to the form of a screw, and the action of the beater thus effectually forces the solidifying cream between the beater bars.

G, is a double gear wheel provided with a spindle, $m$, which extends through the elongated bearing surface in the tub top, D, and is squared on its outer end, $n$, to receive the operating crank.

H, is a horizontal shaft, squared at its outer end, $o$, to receive the operating crank and journaled in suitable bearings $p$, $p$, in the tub top. Secured on the inner end of this shaft, is a beveled gear wheel, K, which meshes with the upper set of teeth, $r$, of the double gear G.

$s$, $s$, are the lower set of teeth of this double gear G, which mesh with the spur wheel E, by means of which the can is revolved as above set forth. A squared recess, $t$, is formed in the inner surface of the double gear G, within which fits the squared end of the spindle, F, of the beater, so that the beater is revolved by the gear G. The upper surface of the double gear G, is formed with a cup or recess, $u$, which will retain any oil or salt water which may run down the spindle $m$ of the gear. The lower portion of this gear G, is formed with a hub $w$ which fits into the proper recess in the can top C and upon the lower face of this hub the weight of the tub top D and the gear mechanism rests, so that at this point the bearing between the can and the tub top is concentrated, thus to a very large extent lessening the friction and making the operation very easy.

It will be further noted that in order to retain the two positions of operation for the hand crank, three gear wheels are employed, and that inasmuch as all of these gear wheels are separate and distinct pieces and readily removed from their attachment to the tub top, if the teeth of any one of them become broken, that particular gear can be removed and a new one supplied without the necessity of sending the entire tub top to the manufacturer, an advantage which cannot be obtained where the gears are permanently secured to the tub top or can, as is usually the case.

Having thus described my invention, what I claim, and desire to secure by Letters Patent, is—

1. In an ice cream freezer, the combination, with the can and beater, with spindle therefor, of a gear wheel to revolve the can, with recess therein to receive said spindle, and stem on the gear wheel extending through the tub top, said stem being squared at its outer end to receive the operating crank, whereby the crank may be operated horizontally to revolve the beater, substantially as shown and described.

2. In an ice cream freezer, the combination, with the can and beater, with spindle therefor, of a gear wheel to revolve the can having a double set of teeth, spur wheel meshing with one set of said teeth, and beveled gear wheel, with shaft at right angles to said spindle, meshing with the other set, said double gear being provided with a recess therein to receive said spindle, and stem on said double gear extending through the tub top, said stem being square at its outer end to receive the operating crank, whereby said crank may be operated either horizontally or vertically to revolve the beater, substantially as shown and described.

3. In an ice cream freezer, the combination, with the can and beater, with spindle therefor, of a gear wheel to revolve the can, with recess therein to receive said spindle, and stem on the gear wheel extending through the tub top, said stem being squared at its outer end to receive the operating crank, and with an oil cup formed around said stem, and cover for said gear, whereby the crank may be operated horizontally to revolve the beater and said can effectually sealed against oil or dirt, substantially as shown and described.

4. In an ice cream freezer, the combination, with the can and beater, with spindle therefor, of a gear wheel to revolve the can having a double set of teeth, spur wheel meshing with one set of said teeth, and beveled gear wheel, with shaft at right angles to said spindle, meshing with the other set, said double gear being provided with a recess therein to receive said spindle, and stem on said double gear extending through the tub top, said stem being square at its outer end to receive the operating crank, and with oil cup formed around said stem, and cover for said gearing, whereby said crank may be operated either horizontally or vertically to revolve the can, and said can effectually sealed against oil or dirt, substantially as shown and described.

5. In an ice cream freezer, a beater provided with vertical beater bars, one of said bars having inclined wings on the outer edge thereof, and formed with scallops on the inner edge, to approximate a screw, whereby the solidifying cream may be effectually forced between the beater bars, substantially as shown and described.

FRANK M. SNOOK.

Witnesses:
GEORGE HEIDMAR,
H. F. WORLEY.